US012609031B2

(12) United States Patent
Nishizawa et al.

(10) Patent No.: US 12,609,031 B2
(45) Date of Patent: Apr. 21, 2026

(54) NOTIFICATION DEVICE, NOTIFICATION METHOD, AND PROGRAM

(71) Applicant: HONDA MOTOR CO., LTD., Tokyo (JP)

(72) Inventors: Yuta Nishizawa, Wako (JP); Kenji Komori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 18/121,603

(22) Filed: Mar. 15, 2023

(65) Prior Publication Data

US 2023/0316925 A1     Oct. 5, 2023

(30) Foreign Application Priority Data

Mar. 30, 2022     (JP) ................................. 2022-055917

(51) Int. Cl.
| | |
|---|---|
| *G08G 1/16* | (2006.01) |
| *G05B 13/02* | (2006.01) |
| *G08G 1/005* | (2006.01) |
| *G08G 1/01* | (2006.01) |

(52) U.S. Cl.
CPC ......... *G08G 1/166* (2013.01); *G05B 13/0265* (2013.01); *G08G 1/005* (2013.01); *G08G 1/0125* (2013.01); *G08G 1/0141* (2013.01)

(58) Field of Classification Search
CPC ..... G06Q 10/06311; G06Q 10/063114; G08G 1/096725; G08G 1/0962; G05B 13/0265; B60Q 9/008
USPC .............................. 705/7.11, 7.13, 7.16, 7.22
See application file for complete search history.

(56) References Cited

U.S. PATENT DOCUMENTS

| | | | | |
|---|---|---|---|---|
| 7,463,948 | B2 * | 12/2008 | Orita .................... | G05D 1/0255 |
| | | | | 901/1 |
| 8,954,252 | B1 * | 2/2015 | Urmson ................. | G08G 1/167 |
| | | | | 701/301 |
| 10,223,919 | B2 * | 3/2019 | Bai ......................... | B60K 35/00 |
| 11,087,291 | B2 * | 8/2021 | Onimaru ............ | G01C 21/3691 |
| 11,127,083 | B1 * | 9/2021 | Konrardy ............... | G08G 1/166 |

(Continued)

FOREIGN PATENT DOCUMENTS

| | | | | | |
|---|---|---|---|---|---|
| CA | 3148680 | A1 | * | 3/2021 | ....... G08G 1/096758 |
| CN | 110232493 | B | * | 7/2021 | ......... A01D 41/1217 |

(Continued)

OTHER PUBLICATIONS

A translated version of Ebisawa document (JP-2020098530-A) (Year: 2020).*

(Continued)

*Primary Examiner* — Cuong H Nguyen

(74) *Attorney, Agent, or Firm* — Amin, Turocy & Watson, LLP

(57)     ABSTRACT

A notification device capable of providing an alarm notification with respect to a person who is likely to jump into a travel route of a vehicle at an appropriate timing is provided. The notification device provided in the vehicle acquires attribute information about a person located within a range of a predetermined distance from the vehicle. The notification device classifies the person based on the attribute information. The notification device adjusts a timing of a notification for the person based on a classification result.

12 Claims, 6 Drawing Sheets

(56)                References Cited

U.S. PATENT DOCUMENTS

| | | | | |
|---|---|---|---|---|
| 11,155,259 | B2 * | 10/2021 | Yao | G06T 7/277 |
| 11,541,884 | B2 * | 1/2023 | Al-Stouhi | B60W 50/14 |
| 2017/0011210 | A1 * | 1/2017 | Cheong | A61B 5/681 |
| 2019/0047552 | A1 | 2/2019 | Hattori | |
| 2020/0070716 | A1 | 3/2020 | Sakata et al. | |
| 2021/0284148 | A1 | 9/2021 | Kato | |
| 2022/0012988 | A1 | 1/2022 | Avadhanam et al. | |
| 2022/0406076 | A1 * | 12/2022 | Horiuchi | G06V 20/58 |
| 2023/0005371 | A1 * | 1/2023 | Aoude | G08G 1/166 |

FOREIGN PATENT DOCUMENTS

| | | | | |
|---|---|---|---|---|
| CN | 113386749 | | 9/2021 | |
| CN | 110544390 | B * | 3/2022 | G08G 1/166 |
| CN | 110913683 | B * | 2/2023 | A01D 34/14 |
| DE | 102021203354 | B4 * | 11/2022 | B60R 21/0132 |
| EP | 3566563 | A1 * | 11/2019 | A01D 41/127 |
| JP | 2002-029282 | | 1/2002 | |
| JP | 2005-263012 | | 9/2005 | |
| JP | 2011-248855 | | 12/2011 | |
| JP | 2015-032312 | | 2/2015 | |
| JP | 2017-138687 | | 8/2017 | |
| JP | 2018-106351 | | 7/2018 | |
| JP | 2019-106049 | | 6/2019 | |
| JP | 2020-098530 | | 6/2020 | |
| JP | 2020098530 | A * | 6/2020 | B60W 30/0953 |
| JP | 2021528790 | A * | 10/2021 | G05D 1/0038 |
| JP | 2022-014909 | | 1/2022 | |
| WO | 2017/138658 | | 8/2017 | |
| WO | WO-2021141770 | A1 * | 7/2021 | G06F 18/23211 |

OTHER PUBLICATIONS

An English translated version of Japanese Patent ( Jp 2021528790A published on Oct. 21, 2021) (Year: 2023).*
Japanese Office Action for Japanese Patent Application No. 2022-055917 mailed Jul. 22, 2025.
Chinese Office Action for Chinese Patent Application No. 202310252095.5 mailed Nov. 7, 2025.

* cited by examiner

NOTIFICATION DEVICE, NOTIFICATION METHOD, AND PROGRAM

CROSS-REFERENCE TO RELATED APPLICATION

Priority is claimed on Japanese Patent Application No. 2022-055917, filed Mar. 30, 2022, the content of which is incorporated herein by reference.

BACKGROUND OF THE INVENTION

Field of the Invention

The present invention relates to a notification device, a notification method, and a program.

Description of Related Art

When a driver of a vehicle recognizes that a person has jumped into the vehicle's travel route, the driver performs a driving operation such as stepping on the brake. Related technology is disclosed in Patent Document 1 (Japanese Unexamined Patent Application, First Publication No. 2020-98530).

In Patent Document 1, technology for identifying an approaching vehicle approaching a crossing prediction area that pedestrians are expected to pass through from the start of crossing a road to the end of the crossing, predicting whether or not the approaching vehicle will collide with a pedestrian, and providing a notification of a risk of the collision when the approaching vehicle is predicted to collide with the pedestrian is disclosed.

SUMMARY OF THE INVENTION

As described above, it is desirable to provide an alarm notification when a person is likely to jump into a travel route along which a vehicle is traveling at an appropriate timing in accordance with an attribute of the person.

The present invention has been made in consideration of such circumstances and an objective thereof is to provide a notification device, a notification method, and a program capable of providing an alarm notification with respect to a person who is likely to jump into a travel route of a vehicle at an appropriate timing.

A notification device, a notification method, and a program according to the present invention adopt the following configurations.

(1): According to an aspect of the present invention, there is provided a notification device including: an attribute acquisition part configured to acquire attribute information about a person located within a range of a predetermined distance from a moving object; a classification part configured to classify the person based on the attribute information; and an adjustment part configured to adjust a timing of a notification for the person based on a classification result.

(2): In the above-described aspect (1), the attribute information may include information about at least the age of the person, and the classification part may output the classification result related to the age of the person based on the age.

(3): In the above-described aspect (1) or (2), the notification device may include a person recognition part configured to recognize the person; and an attribute estimation part configured to estimate the attribute information of the person based on a result of recognizing the person.

(4): In any one of the above-described aspects (1) to (3), the notification device may include a moving state estimation part configured to estimate a moving direction and a moving speed of the person, wherein the adjustment part may further adjust the timing of the notification for the person based on the moving direction and the moving speed of the person.

(5): In any one of the above-described aspects (1) to (3), the notification device may include a moving state estimation part configured to detect a moving speed of the person, wherein the adjustment part may further adjust the timing of the notification for the person based on the moving speed of the person.

(6): In any one of the above-described aspects (1) to (5), the notification device may include a travel route recognition part configured to recognize intersection status of a travel route along which the moving object travels associated with another travel route, wherein the adjustment part may adjust the timing of the notification for the person based on the intersection status.

(7): In any one of the above-described aspects (1) to (5), the notification device may include a travel route recognition part configured to recognize intersection status of a travel route along which the moving object travels associated with another travel route, wherein the adjustment part may adjust the timing of the notification for the person based on the intersection status and a location of the person.

(8): In any one of the above-described aspects (1) to (7), the adjustment part may adjust the timing so that an earliest notification can be provided when it is difficult to acquire the attribute information within a predetermined period of time from a timing when the person has been recognized.

(9): In the above-described aspect (7), the adjustment part may adjust the timing so that an earliest notification can be provided when it is difficult to recognize the intersection status of the travel route associated with the other travel route.

(10): In the above-described aspect (5), the adjustment part may adjust the timing so that an earliest notification can be provided when it is difficult to detect the moving speed of the person.

(11): In any one of the above-described aspects (1) to (10), the adjustment part may identify a collision margin time indicating a period of time from the time when the person moves to the travel route along which the moving object travels to the time when the person collides with the moving object according to a plurality of ages indicated in the classification result for the person and adjust the timing of the notification to a timing when the collision margin time can be ensured.

(12): In any one of the above-described aspects (1) to (11), the adjustment part may identify a collision margin time indicating a period of time from the time when the person moves to the travel route along which the moving object travels to the time when the person collides with the moving object based on a result of classifying a moving speed of the person and adjust the timing of the notification to a timing when the collision margin time can be ensured.

(13): In any one of the above-described aspects (6), (7), and (9), the adjustment part may identify a collision margin time indicating a period of time from the time when the person moves to the travel route along which the moving object travels to the time when the person collides with the moving object based on intersection status of the travel route associated with the other travel route and a location of the person and adjust the timing of the notification to a timing when the collision margin time can be ensured.

(14): According to an aspect of the present invention, there is provided a notification method including: acquiring, by a computer, attribute information about a person located within a range of a predetermined distance from a moving object; classifying, by the computer, the person based on the attribute information; and adjusting, by the computer, a timing of a notification for the person based on a classification result.

(15): According to an aspect of the present invention, there is provided a program for causing a computer to execute processes of: acquiring attribute information about a person located within a range of a predetermined distance from a moving object; classifying the person based on the attribute information; and adjusting a timing of a notification for the person based on a classification result.

According to the aspects (1) to (15), a notification such as an alarm can be provided at an appropriate timing for a person who is likely to jump into a travel route along which the moving object is traveling based on the classification of the person.

According to the aspect (2), a notification such as an alarm can be provided at an appropriate timing for a person based on the classification based on the age of the person who is likely to jump into a travel route along which the moving object is traveling.

According to the aspect (3), a notification such as an alarm can be provided at an appropriate timing in accordance with an attribute of a person identified based on a result of recognizing the person.

According to the aspect (4), a notification such as an alarm can be provided at an appropriate timing for a person who is likely to jump into a travel route along which the moving object is traveling based on a moving direction and a moving speed of the person.

According to the aspect (5), a notification such as an alarm can be provided at an appropriate timing for a person based on a moving speed of the person who is likely to jump into a travel route along which the moving object is traveling.

According to the aspect (6), a notification such as an alarm can be provided at an appropriate timing for a person who is likely to jump into a travel route along which the moving object is traveling based on intersection status of the travel route along which the moving object travels associated with another travel route.

According to the aspect (7), a notification such as an alarm can be provided at an appropriate timing for a person who is likely to jump into a travel route along which the moving object is traveling based on intersection status of the travel route along which the moving object travels associated with another travel route and a location of the person.

According to the aspect (8), a notification such as an alarm can be provided at an earliest timing when it is difficult to recognize a person.

According to the aspect (9), a notification such as an alarm can be provided at an earliest timing when it is difficult to recognize a shape of a travel route along which the moving object travels.

According to the aspect (10), a notification such as an alarm can be provided at an earliest timing when it is difficult to detect a moving speed of a person.

According to the aspect (11), a notification timing can be adjusted to a timing when a collision margin time calculated in accordance with the age of a person can be ensured.

According to the aspect (12), a notification timing can be adjusted to a timing when a collision margin time calculated in accordance with a moving speed of a person can be ensured.

According to the aspect (13), a notification timing can be adjusted to a timing when a collision margin time calculated in accordance with intersection status of the travel route along which the moving object travels associated with another travel route and a location of a person can be ensured.

DETAILED DESCRIPTION OF THE INVENTION

Hereinafter, embodiments of a notification device, a notification method, and a program of the present invention will be described with reference to the drawings. The notification device is a device provided in a moving object. The moving object may be a vehicle with three wheels, four wheels, or the like, a two-wheeled vehicle, micromobility, and the like, and may be any moving object that can move on a road surface of a travel route. In the following description, the moving object is assumed to be a four-wheeled vehicle, and a vehicle including a notification device is referred to as a vehicle M.

[Overview]

Figure 1:
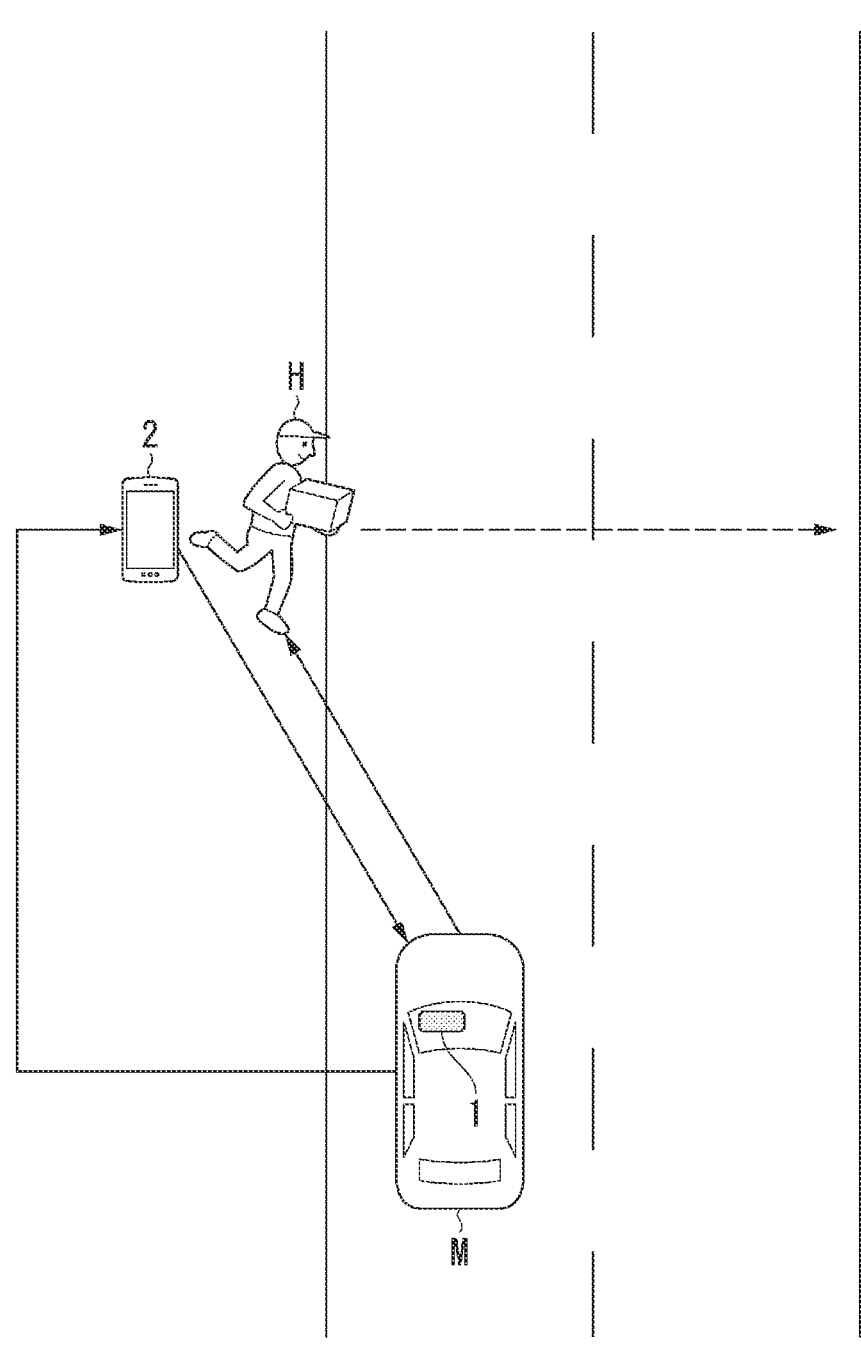
FIG. 1 is a diagram for describing an overview of a notification system according to an embodiment of the present invention.

FIG. 1 is a diagram for schematically describing a notification system according to an embodiment of the present invention. As shown in FIG. 1, a notification device 1 constituting a notification system 100 is mounted in the vehicle M. When the notification device 1 detects a pedestrian H who is likely to jump into a travel route, the notification device 1 provides a notification such as an alarm to a notification destination device such as a terminal 2 carried by the pedestrian H.

Figure 2:
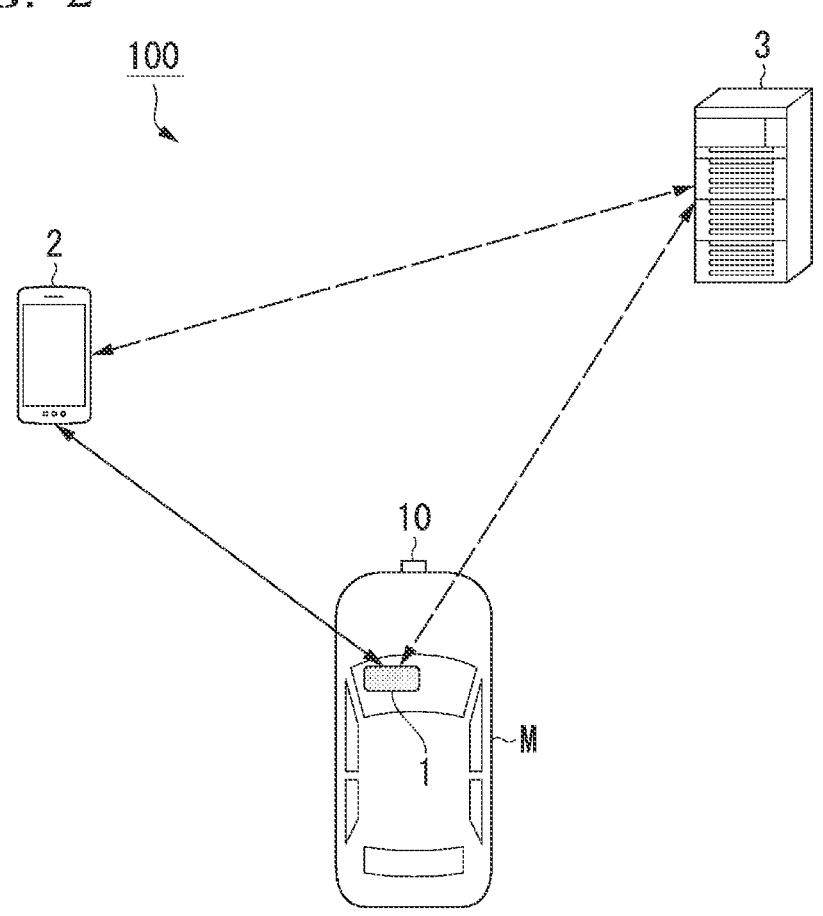
FIG. 2 is a schematic configuration diagram of the notification system according to the embodiment of the present invention.

FIG. 2 is a schematic configuration diagram of a notification system according to the embodiment of the present invention. As shown in FIG. 1, the vehicle M includes at least a camera 10 and a notification device 1 as a device constituting the notification system 100 of the present embodiment. The camera 10 and the notification device 1 are connected to each other through a multiplex communication line such as a controller area network (CAN) communication line, a serial communication line, or a wireless communication network. Also, the configuration shown in FIG. 1 is only an example and another configuration may be added.

For example, the camera 10 is a digital camera using a solid-state imaging element such as a charge-coupled device (CCD) or a complementary metal-oxide semiconductor (CMOS). Although the camera 10 is installed on, for example, a front bumper of the vehicle M, in the present embodiment, the camera 10 images the view in front of the vehicle at a predetermined interval such as 10 milliseconds and outputs a captured image to the notification device 1. An angle of view of the camera 10 may be set so that, for example, a person walking or running along a left sidewalk of a travel route 5 m ahead in the traveling direction and a person walking or running along a right sidewalk of the travel route 5 m ahead in the traveling direction are shown. The camera may be a stereo camera.

The notification device 1 communicates with the terminal 2 of the pedestrian H who is likely to jump into a travel route. The notification device 1 provides a notification such as an alarm when the pedestrian H holding the terminal 2 is likely to jump out in front of the vehicle M by establishing a communication connection with the terminal 2. The notification device 1 may directly establish a communication connection with the terminal 2 or may establish a communication connection via another device such as a server device 3.

[Notification Device]

Figure 3:
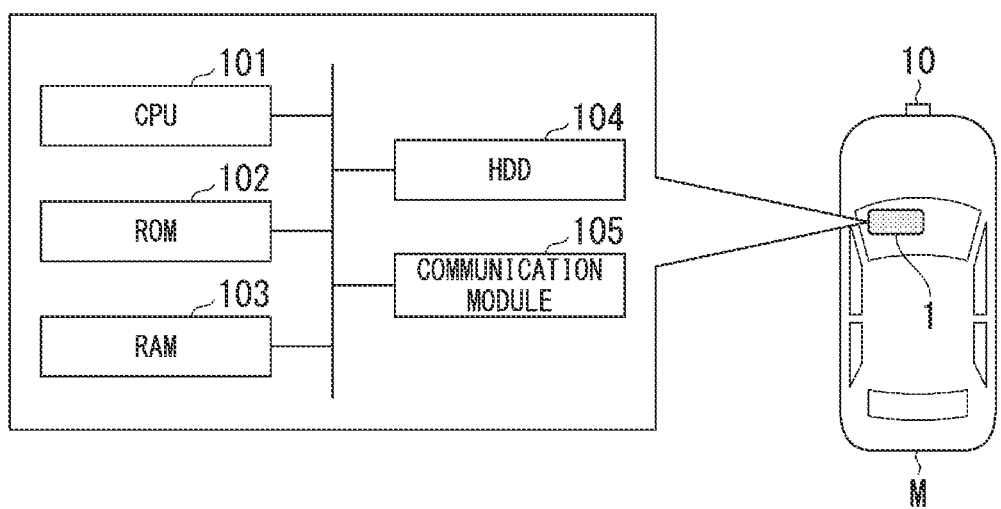
FIG. 3 is a hardware configuration diagram of a notification device according to the embodiment of the present invention.

FIG. 3 is a hardware configuration diagram of the notification device.

As shown in FIG. 3, the notification device 1 is a computer including hardware such as a central processing unit (CPU) 101, a read-only memory (ROM) 102, a random-access memory (RAM) 103, a hard disk drive (HDD) 104, and a communication module 105. The terminal 2 and the server device 3 may have similar hardware configurations.

Figure 4:
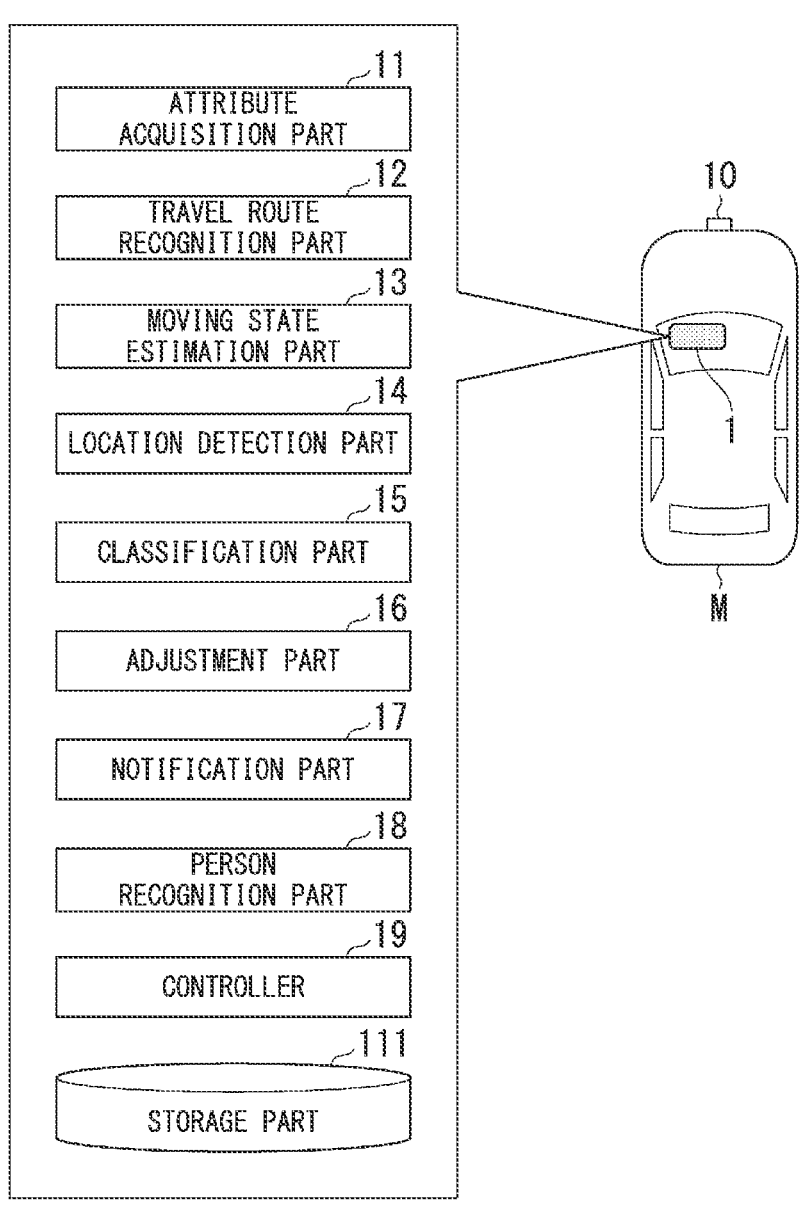
FIG. 4 is a first diagram showing functional blocks of the notification device according to the embodiment of the present invention.

FIG. 4 is a first diagram showing a functional block of the notification device.

The notification device 1 includes, for example, an attribute acquisition part 11, a travel route recognition part 12, a moving state estimation part 13, a location detection part 14, a classification part 15, an adjustment part 16, a notification part 17, a person recognition part 18, a controller 19, and a storage part 111. The storage part 111 stores, for example, a trained model. These components are implemented by, for example, a hardware processor such as the CPU 101 executing a program (software). Also, some or all of these components may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device such as the HDD 104 or the ROM 102 or may be stored in a removable storage medium (a non-transitory storage medium) such as a DVD or a CD-ROM and installed when the storage medium is mounted in a drive device. The storage part 111 is implemented by, for example, the ROM 102, the RAM 103, a flash memory, an SD card, the HDD 104, a register, or the like.

The attribute acquisition part 11 acquires attribute information about a person (the pedestrian H) located within a predetermined distance range from the vehicle M.

The travel route recognition part 12 recognizes the intersection status of the travel route along which the vehicle M travels associated with another travel route. Specifically, the travel route recognition part 12 recognizes whether the intersection status associated with the other travel route is a crossroads or a straight road that does not intersect the other travel route in a travel route of the vehicle M within the predetermined distance in the traveling direction.

The moving state estimation part 13 determines whether the pedestrian H located within the predetermined distance from the vehicle M is walking or running.

The location detection part 14 detects the location of the pedestrian H based on the traveling direction of the vehicle M traveling along the travel route.

The classification part 15 classifies which of a first age range (12 years old or younger), a second age range (13 to 59 years old), and a third age range (60 years old or older) the age of the pedestrian H belongs to based on the attribute information of the pedestrian H located within a range of a predetermined distance from the vehicle M.

The adjustment part 16 adjusts a notification timing of the alarm to the pedestrian H based on a classification result.

The notification part 17 provides a notification of an alarm.

The person recognition part 18 recognizes a person such as the pedestrian H from the captured image.

The controller 19 performs various types of control other than those of the above-described other functional parts.

The storage part 111 stores various types of information necessary for a process of the notification device 1.

[Notification Timing Adjustment Method]

Figure 5:
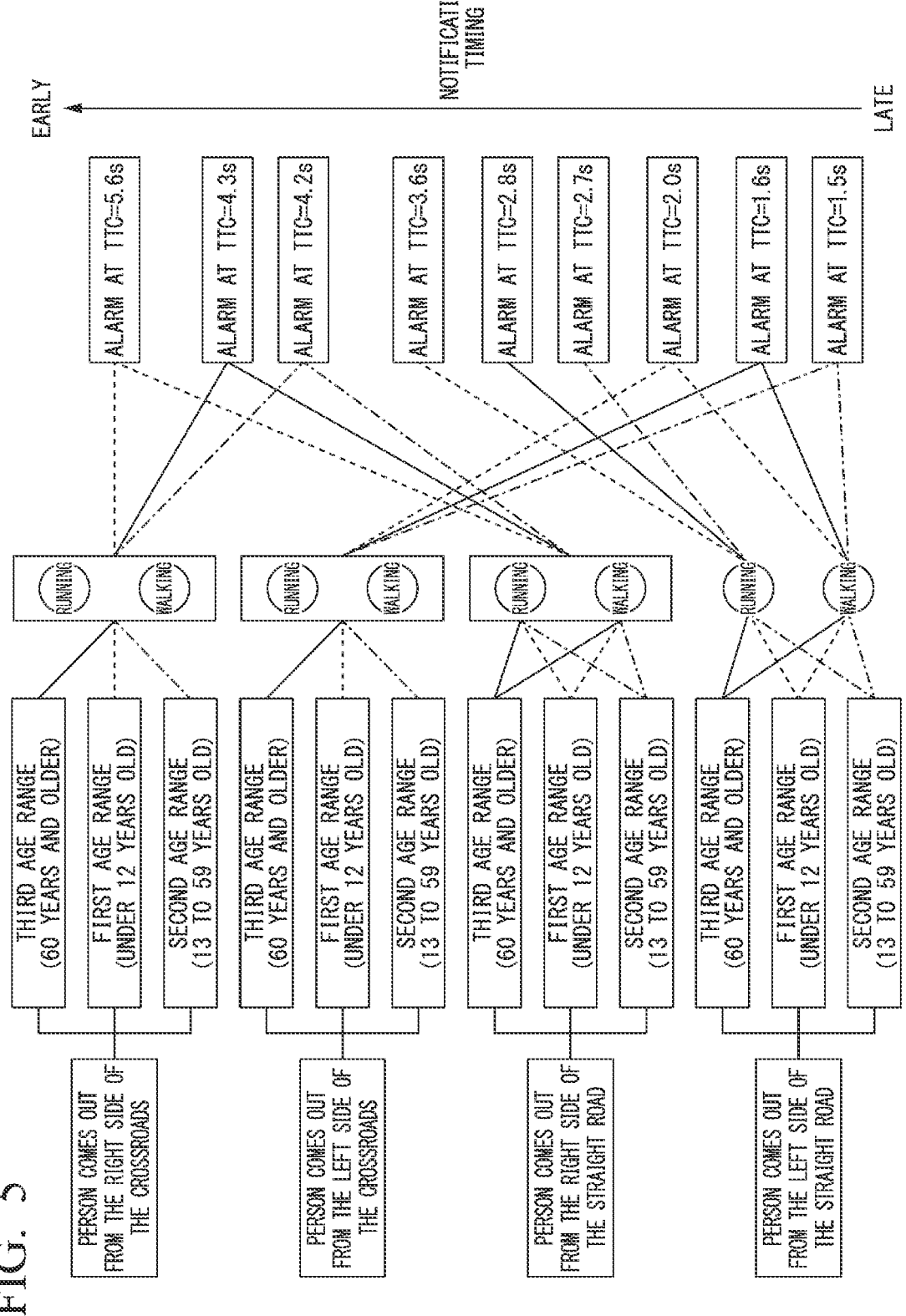
FIG. 5 is a diagram showing an example of a notification timing adjustment method according to the embodiment of the present invention.

FIG. 5 is a diagram showing an example related to a method of adjusting the notification timing of the alarm.

The adjustment part 16 adjusts different notification timings in accordance with processing results of the travel route recognition part 12, the moving state estimation part 13, the location detection part 14, and the classification part 15. Specifically, the adjustment part 16 adjusts a notification timing according to whether the intersection status of the travel route along which the vehicle M travels associated with another travel route is a crossroads or a straight road, which of the first age range, the second age range, and the third age range the age of the pedestrian H belongs to, whether the movement of the pedestrian H is walking or running, or whether the location of the pedestrian H based on the vehicle M traveling along the travel route is at the right or left side.

For example, the adjustment part 16 identifies a collision margin time (time-to-collision (TTC)) indicating a predicted estimation time from the time when the pedestrian H located on the sidewalk moves to the travel route of the vehicle M to the time when the pedestrian H collides with the vehicle M as 5.6 sec regardless of whether the pedestrian H is walking or running when a recognition result of the travel route recognition part 12 is the crossroads, an estimation result of the moving state estimation part 13 is the first age range, and the location of the pedestrian H is at the right side in the traveling direction. The adjustment part 16 identifies the collision margin time indicating the predicted estimation time from the time when the pedestrian H located on the sidewalk moves to the travel route of the vehicle M to the time when the pedestrian H collides with the vehicle M as 4.2 sec regardless of whether the pedestrian H is walking or running when the recognition result of the travel route recognition part 12 is the crossroads, the estimation result of the moving state estimation part 13 is the second age range, and the location of the pedestrian H is at the right side in the traveling direction. The adjustment part 16 identifies the collision margin time indicating the predicted estimation time from the time when the pedestrian H located on the sidewalk moves to the travel route of the vehicle M to the time when the pedestrian H collides with the vehicle M as 4.3 sec regardless of whether the pedestrian H is walking or running when the recognition result of the travel route recognition part 12 is the crossroads, the estimation result of the moving state estimation part 13 is the third age range, and the location of the pedestrian H is at the right side in the traveling direction.

The adjustment part 16 identifies the collision margin time indicating the predicted estimation time from the time when the pedestrian H located on the sidewalk moves to the travel route of the vehicle M to the time when the pedestrian H collides with the vehicle M as 2.0 sec regardless of whether the pedestrian H is walking or running when the recognition result of the travel route recognition part 12 is the crossroads, the estimation result of the moving state estimation part 13 is the first age range, and the location of the pedestrian H is at the left side in the traveling direction. The adjustment part 16 identifies the collision margin time indicating the predicted estimation time from the time when the pedestrian H located on the sidewalk moves to the travel route of the vehicle M to the time when the pedestrian H collides with the vehicle M as 1.5 sec regardless of whether the pedestrian H is walking or running when the recognition result of the travel route recognition part 12 is the crossroads, the estimation result of the moving state estimation part 13 is the second age range, and the location of the pedestrian H is at the left side in the traveling direction. The adjustment part 16 identifies the collision margin time indicating the predicted estimation time from the time when the pedestrian H located on the sidewalk moves to the travel route of the vehicle M to the time when the pedestrian H collides with the vehicle M as 1.6 sec regardless of whether the pedestrian H is walking or running when the recognition result of the travel route recognition part 12 is the crossroads, the estimation result of the moving state estimation part 13 is the third age range, and the location of the pedestrian H is at the left side in the traveling direction.

For example, the adjustment part 16 identifies the collision margin time indicating the predicted estimation time from the time when the pedestrian H located on the sidewalk moves to the travel route of the vehicle M to the time when the pedestrian H collides with the vehicle M as 5.6 sec regardless of whether the pedestrian H is walking or running when the recognition result of the travel route recognition part 12 is the straight road, the estimation result of the moving state estimation part 13 is the first age range, and the location of the pedestrian H is at the right side in the traveling direction. The adjustment part 16 identifies the collision margin time indicating the predicted estimation time from the time when the pedestrian H located on the sidewalk moves to the travel route of the vehicle M to the time when the pedestrian H collides with the vehicle M as 4.2 sec regardless of whether the pedestrian H is walking or running when the recognition result of the travel route recognition part 12 is the straight road, the estimation result of the moving state estimation part 13 is the second age range, and the location of the pedestrian H is at the right side in the traveling direction. The adjustment part 16 identifies the collision margin time indicating the predicted estimation time from the time when the pedestrian H located on the sidewalk moves to the travel route of the vehicle M to the time when the pedestrian H collides with the vehicle M as 4.3 sec regardless of whether the pedestrian H is walking or running when the recognition result of the travel route recognition part 12 is the straight road, the estimation result of the moving state estimation part 13 is the third age range, and the location of the pedestrian H is at the right side in the traveling direction.

For example, the adjustment part 16 identifies the collision margin time indicating the predicted estimation time from the time when the pedestrian H located on the sidewalk moves to the travel route of the vehicle M to the time when the pedestrian H collides with the vehicle M as 2.0 sec if the pedestrian H is walking when the recognition result of the travel route recognition part 12 is the straight road, the estimation result of the moving state estimation part 13 is the first age range, and the location of the pedestrian H is at the left side in the traveling direction. The adjustment part 16 identifies the collision margin time indicating the predicted estimation time from the time when the pedestrian H located on the sidewalk moves to the travel route of the vehicle M to the time when the pedestrian H collides with the vehicle M as 3.6 sec if the pedestrian H is running when the recognition result of the travel route recognition part 12 is the straight road, the estimation result of the moving state estimation part 13 is the first age range, and the location of the pedestrian H is at the left side in the traveling direction. The adjustment part 16 identifies the collision margin time indicating the predicted estimation time from the time when the pedestrian H located on the sidewalk moves to the travel route of the vehicle M to the time when the pedestrian H collides with the vehicle M as 1.5 sec if the pedestrian H is walking when the recognition result of the travel route recognition part 12 is the straight road, the estimation result of the moving state estimation part 13 is the second age range, and the location of the pedestrian H is at the left side in the traveling direction. The adjustment part 16 identifies the collision margin time indicating the predicted estimation time from the time when the pedestrian H located on the sidewalk moves to the travel route of the vehicle M to the time when the pedestrian H collides with the vehicle M as 2.7 sec if the pedestrian H is running when the recognition result of the travel route recognition part 12 is the straight road, the estimation result of the moving state estimation part 13 is the second age range, and the location of the pedestrian H is at the left side in the traveling direction. The adjustment part 16 identifies the collision margin time indicating the predicted estimation time from the time when the pedestrian H located on the sidewalk moves to the travel route of the vehicle M to the time when the pedestrian H collides with the vehicle M as 1.6 sec if the pedestrian H is walking when the recognition result of the travel route recognition part 12 is the straight road, the estimation result of the moving state estimation part 13 is the third age range, and the location of the pedestrian H is at the left side in the traveling direction. The adjustment part 16 identifies the collision margin time indicating the predicted estimation time from the time when the pedestrian H located on the sidewalk moves to the travel route of the vehicle M to the time when the pedestrian H collides with the vehicle M as 2.8 sec if the pedestrian H is running when the recognition result of the travel route recognition part 12 is the straight road, the estimation result of the moving state estimation part 13 is the third age range, and the location of the pedestrian H is at the left side in the traveling direction.

According to a notification timing adjustment process of the adjustment part 16 as described above, in the case where the pedestrian H is at the right side of the vehicle M in the traveling direction, the notification timing when the notification such as the alarm is provided is set to be earlier than the notification timing in the case where the pedestrian H is at the left side of the vehicle M in the traveling direction. A person such as the pedestrian H at the left side of the vehicle M in the traveling direction is likely to be located within the angle of view of the camera 10 of the vehicle M and is likely to be sufficiently recognized by the recognition result of the camera 10. Accordingly, the notification device 1 according to the present embodiment can increases priority of the pedestrian H who is unlikely to be located within the angle of view of the camera 10 and can provide a notification such as an alarm. Further, according to the adjustment of the notification timing of the adjustment part 16 described above, when the pedestrian H is in the first age range (a child of 13 years old or younger), a notification timing when a notification such as an alarm is provided at an early timing is set as compared with the other age ranges. Accordingly, the notification device 1 according to the present embodiment can provide a notification such as an alarm with high priority when the age range of the pedestrian H is the age range of a child.

The storage part 111 may store the collision margin time associated with a combination of information of the age range (any one of the first to third age ranges) of the pedestrian H, the intersection status (the crossroads or the straight road) of the travel route along which the vehicle M travels associated with another travel route, the location information (the left side or the right side) of the pedestrian H in the traveling direction of the vehicle M, and the moving state (the walking or the running) of the pedestrian H in a data table stored in the storage part 111. The adjustment part 16 may acquire the collision margin time recorded on the data table in association with a combination of information of the age range (any one of the first to third age ranges) of the pedestrian H, the intersection status (the crossroads or the straight road) of the travel route along which the vehicle M travels associated with another travel route, the location information (the left side or the right side) of the pedestrian H in the traveling direction of the vehicle M, and the moving state (the walking or the running) of the pedestrian H and may identify the time.

[Travel Route Detection Process]

The attribute acquisition part 11 acquires the age of the pedestrian H from among the attribute information of the pedestrian H included in the personal attribute information acquired from the terminal 2 or the server device 3. The attribute acquisition part 11 may acquire the age recognized by the person recognition part 18 from the captured image.

[Travel Route Recognition Process]

The travel route recognition part 12 generates a learning model by performing a machine learning process in advance for a captured image generated by the camera 10 imaging the view in front of the travel route. The travel route recognition part 12 recognizes the intersection status of the travel route along which the vehicle M travels associated with another travel route using this learning model and recognizes whether the intersection status is a crossroads or a straight road. In the learning model, the learning device generates a learning model by performing a machine learning process using a large number of relationships between the captured image and correct answer information of the intersection status between the travel route and another travel route shown in the captured image. The storage part 111 of the notification device 1 stores the learning model generated by the learning device. The travel route recognition part 12 of the notification device 1 inputs a captured image to a neural network generated using, for example, a learning model and consequently determines whether or not the status between the travel route and the other travel route shown in the captured image is a crossroads. When it can be determined that the status is a crossroads, the travel route recognition part 12 outputs information indicating a crossroads to the adjustment part 16. Otherwise, the travel route recognition part 12 outputs information indicating a straight road to the adjustment part 16. The travel route recognition part 12 may be configured to clearly determine whether a road in front of the travel route is a crossroads or a straight road using the captured image and the learning model.

The travel route recognition part 12 may recognize whether the status at a predetermined distance such as 30 m in a forward direction in the travel route, is a straight road or a crossroads without using a learning model. For example, the controller 19 of the notification device 1 of the vehicle M acquires location information calculated by receiving a signal from a global navigation satellite system (GNSS) satellite in a location detection function separately provided in the notification device 1 or the vehicle M. The controller 19 periodically accesses the server device 3 every predetermined time such as an interval of 1 sec and transmits an information acquisition request including location information. The server device 3 identifies a traveling direction of the vehicle M and location information included in a plurality of consecutive information acquisition requests based on the location information and identifies information (a crossroads or a straight road) of the status of the travel route within a predetermined distance in the traveling direction from the location information of the vehicle M. The server device 3 transmits information of the status of the travel route to the notification device 1 having transmitted the information acquisition request. Subsequently, the travel route recognition part 12 may be configured to recognize the status of the forward travel route based on the information received from the server device 3.

The travel route recognition part 12 may acquire information indicating the status of a forward travel route from the information received from the terminal 2. The travel route recognition part 12 may acquire information indicating the status of the travel route located at a predetermined distance in front of the vehicle M in the traveling direction from a navigation device mounted in the vehicle M and configured to display a map and a current location in the map.

[Moving State Estimation Process]

The moving state estimation part 13 acquires the moving speed and the moving direction of the pedestrian H from information included in the personal attribute information acquired from the terminal 2 or the server device 3. The moving state estimation part 13 may be configured to calculate the moving direction and the moving speed of the pedestrian H based on location information of a person shown in a plurality of consecutive captured images.

[Location Detection Process]

The location detection part 14 determines whether the pedestrian H is located at the right side or the left side of the vehicle M in the traveling direction based on the location information included in the personal attribute information. The location detection part 14 may determine whether the pedestrian H is located at the right side or the left side of the vehicle M in the traveling direction based on the location of the person shown in the captured image. The location detection part 14 recognizes the travel route from the captured image, determines that the person is located at the left side when the person is located at the left side of the travel route, and determines that the person is located at the right side when the person is recognized on the right side of the travel route.

First Embodiment

Figure 6:
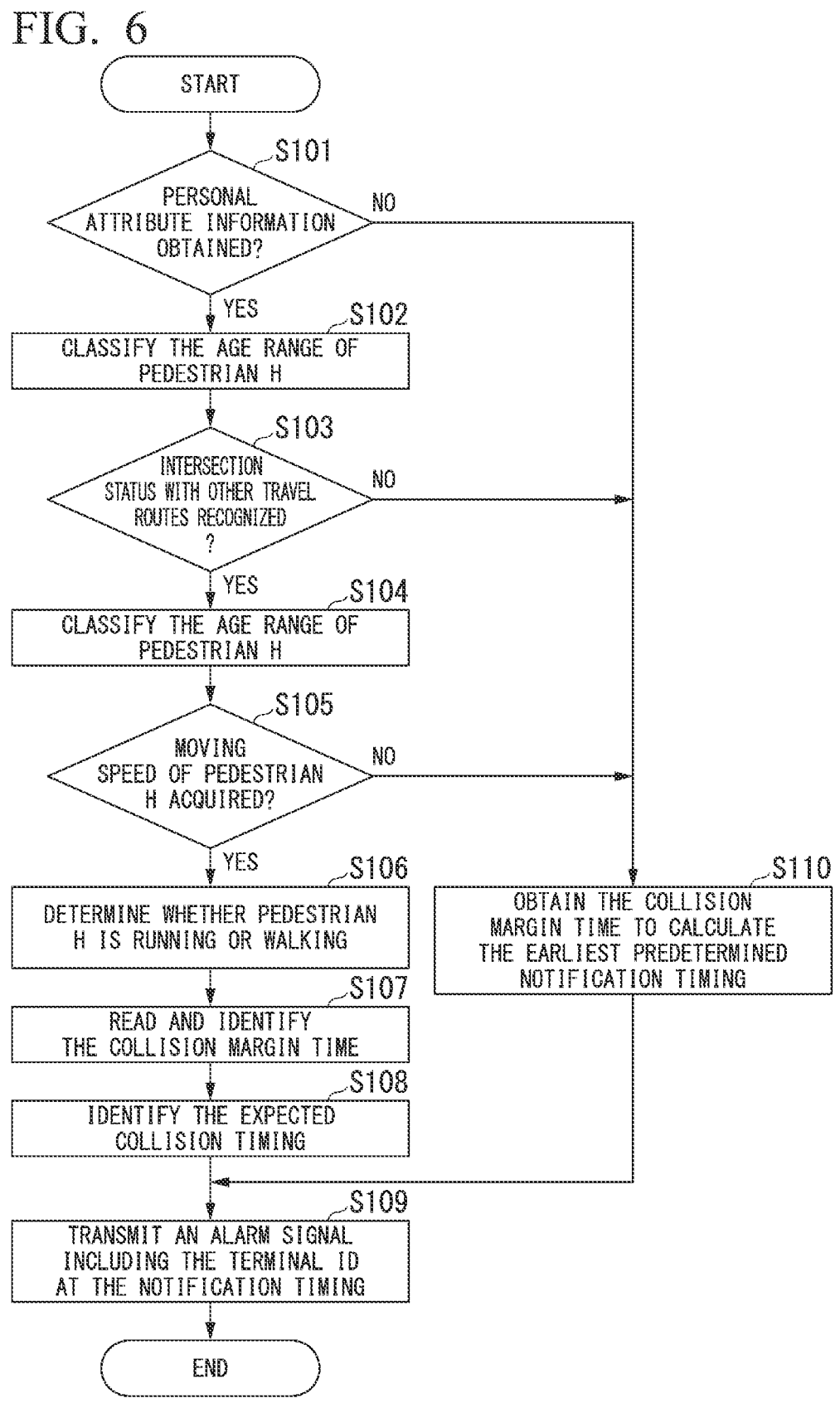
FIG. 6 is a diagram showing a processing flow of the notification device according to the embodiment of the present invention.

FIG. 6 is a diagram showing a processing flow of the notification device. Next, the processing flow of the notification device 1 will be described step by step. A dedicated application program for connecting to the notification system 100 is installed in advance on the terminal 2. When the pedestrian H executes the program of the terminal 2, the terminal 2 has a notification function. Hereinafter, a process of the terminal 2 is a process of this notification function. The terminal 2 detects location information. The location information may be location information calculated by receiving a signal from a GNSS satellite in the location detection function provided in the terminal 2. The location information may be information indicating the latitude, longitude, and altitude of the terminal 2. The terminal 2 may calculate a moving speed and a moving direction of the terminal 2 from a plurality of pieces of location information based on the transition based on the passage of time of the location information. The terminal 2 acquires a gender and age of the pedestrian H that are preset and stored in the terminal 2. The terminal 2 generates personal attribute information including a terminal ID for identifying the terminal 2, the location information, the moving speed, the moving direction, and the gender and age of the pedestrian H. The terminal 2 transmits the personal attribute information to the server device 3. The server device 3 stores the personal attribute information.

The controller 19 of the notification device 1 of the vehicle M acquires location information calculated by receiving a signal from a GNSS satellite in the location detection function separately provided in the notification device 1 or the vehicle M. The controller 19 periodically accesses the server device 3 every predetermined time such as an interval of 1 sec and transmits an information acquisition request including the location information. The server device 3 acquires personal attribute information including location information within a predetermined distance from the location information based on the location information included in the information acquisition request. The predetermined distance may be, for example, a distance such as 100 meters or 200 meters. The server device 3 transmits personal attribute information to the notification device 1 having transmitted the information acquisition request. The notification device 1 receives the personal attribute information.

The notification device 1 may directly acquire the personal attribute information from the terminal 2 without involving the server device 3. For example, the controller 19 of the notification device 1 transmits an information acquisition request at predetermined intervals. This transmission is broadcast by the communication module 105 using a radio signal. The terminal 2 of the pedestrian H located within a predetermined distance (such as 100 meters or 200 meters) from the vehicle M can receive an information acquisition request signal. When the terminal 2 receives the information acquisition request signal, the terminal 2 transmits the generated personal attribute information to the notification device 1 of the vehicle M. The notification device 1 can acquire the personal attribute information.

The controller 19 acquires captured images at predetermined short intervals such as several tens of milliseconds intervals from the camera 10. The controller 19 outputs the captured image to the person recognition part 18. The person recognition part 18 recognizes a person from the captured images. The recognition of a person in the image may be, for example, a process of recognizing the person's face. The process of recognizing the face may be performed using known technology. The person recognition part 18 outputs information indicating whether or not the person can be recognized from the captured image to the adjustment part 16.

The controller 19 of the notification device 1 determines whether or not the personal attribute information can be acquired (step S101). The controller 19 may perform a process of determining whether personal attribute information can be acquired within a predetermined period of time from the time when the person's face was recognized in the captured image. When the controller 19 can acquire the personal attribute information, the controller 19 decides to adjust the notification timing. When it is difficult to acquire the personal attribute information, the controller 19 decides to provide a notification without adjusting the notification timing.

When the notification timing is adjusted, the attribute acquisition part 11 acquires the personal attribute information from the controller 19. The attribute acquisition part 11 acquires the age of the pedestrian H included in the personal attribute information. The attribute acquisition part 11 outputs the age of the pedestrian H to the classification part 15. The classification part 15 classifies the age range of the pedestrian H based on the age of the pedestrian H (step S102). Thereby, the classification part 15 determines which of the first age range, the second age range, and the third age range the age of the pedestrian H belongs to. The classification part 15 outputs the age range of the pedestrian H to the adjustment part 16.

The travel route recognition part 12 acquires a captured image from the camera 10. The travel route recognition part 12 inputs the captured image to a neural network using the learning model or the like using the captured image and the learning model. As a result, the travel route recognition part 12 outputs information of whether the intersection status of the travel route along which the vehicle M travels associated with another travel route is a crossroads or a straight road. In this output process, the travel route recognition part 12 determines whether the intersection status of the travel route along which the vehicle M travels associated with another travel route can be recognized as a crossroads or a straight road based on the captured image (step S103). When information indicating a crossroads or a straight road as the intersection status of the travel route associated with the other travel route has been output, the travel route recognition part 12 determines that recognition has been achieved and outputs a recognition result to the adjustment part 16.

The location detection part 14 calculates a traveling direction vector of the vehicle M in a three-dimensional space based on the transition of the location information of the vehicle M. The location detection part 14 determines whether the pedestrian H is located at the right side or the left side of the traveling direction based on the traveling direction vector based on the current location of the vehicle M and the location information of the pedestrian H (step S104). The location detection part 14 outputs information of the right side when the pedestrian H is located at the right side of the traveling direction and information of the left side when the pedestrian H is located at the left side of the traveling direction as the location information of the pedestrian H to the adjustment part 16.

The moving state estimation part 13 determines whether the moving speed of the pedestrian H has been acquired (step S105). The moving state estimation part 13 may detect and acquire the moving speed from the personal attribute information. The moving state estimation part 13 may calculate the moving speed based on the location information included in the personal attribute information continuously acquired from the terminal 2 at predetermined intervals. The moving state estimation part 13 may be configured to estimate the moving speed using the transition of a location in an image of a person shown in the captured image and technology of an optical flow or the like. When the moving state estimation part 13 can acquire the moving speed of the pedestrian H, the moving speed is output to the adjustment part 16. When the moving direction is included in the personal attribute information, the moving state estimation part 13 outputs information of the moving direction to the adjustment part 16. The moving state estimation part 13 may be configured to calculate the moving direction as in the moving speed calculation process or may be configured to estimate the moving direction of the pedestrian H using the captured image and the optical flow technology.

The adjustment part 16 determines whether the pedestrian H is running or walking based on the moving speed (step S106). For example, the adjustment part 16 may determine that the pedestrian H is walking when the moving speed of the pedestrian H is less than a predetermined speed such as 1 meter per second and may determine that the pedestrian H is running when the moving speed of the pedestrian H is greater than or equal to 1 meter per second.

The adjustment part 16 reads and identifies the collision margin time (TTC) recorded on the timing list stored in the storage part 111 in association with information of the age range (any one of the first to third age ranges) of the pedestrian H, the intersection status (the crossroads or the straight road) of the travel route along which the vehicle M travels associated with another travel route, the location information (the left side or the right side) of the pedestrian H in the traveling direction of the vehicle M, and the moving state (the walking or the running) of the pedestrian H (step S107). The adjustment part 16 outputs the acquired collision margin time and the terminal ID to the notification part 17. This process is an aspect of a process in which the adjustment part 16 of the notification device 1 identifies the collision margin time indicating the period of time from the time when the pedestrian H moves to the travel route along which the vehicle M travels to the time when the pedestrian H collides with the vehicle M and the notification timing is adjusted to a timing when the collision margin time can be ensured.

The notification part 17 identifies an expected collision timing based on the current location of the vehicle M, the traveling speed of the vehicle M, the traveling vector of the vehicle M, the current location of the pedestrian H, and the moving speed and the moving vector of the pedestrian H (step S108). It is only necessary to use known technology in the calculation of the expected collision timing using such information. The notification part 17 transmits an alarm signal including a terminal ID at a notification timing obtained by subtracting the collision margin time from the expected collision timing (step S109). Also, the notification part 17 may immediately transmit the alarm signal when a period of time from the current timing to the expected collision timing is shorter than the collision margin time.

When the period of time from the current timing to the expected collision timing is longer than the collision margin time, the notification part 17 may transmit the alarm signal at the notification timing obtained by subtracting a period of time obtained by adding the collision margin time to a period of time a from the expected collision timing in consideration of the period of time a until the time when the alarm signal is transmitted to the time when the terminal 2 receives the signal and outputs an alarm sound. Even if the period of time from the current timing to the expected collision timing is longer than the collision margin time, the notification part 17 may immediately transmit an alarm signal including the expected collision timing and the collision margin time to the terminal 2. In this case, the terminal 2 may perform a process of calculating an alarm notification timing by subtracting the collision margin time from the expected collision timing and making an alarm sound at the alarm notification timing.

In the above-described process, when it is difficult to acquire the personal attribute information in step S101, when it is difficult to recognize the intersection status of the travel route along which the vehicle M travels associated with another travel route in step S103, when it is difficult to detect the moving speed of the pedestrian H and determine whether the pedestrian H is running or walking in step S106, or the like, the adjustment part 16 acquires a collision margin time for calculating an earliest predetermined notification timing recorded on the data table (step S110). The adjustment part 16 transmits an alarm signal as described above using the collision margin time. The collision margin time is greater than any of the above times. Thereby, it is possible to transmit an alarm signal at an earliest timing.

According to the above-described process, the notification device 1 can provide a notification of an alarm to the pedestrian H approaching the vehicle M at a timing that is the collision margin time earlier than the predicted collision timing when the vehicle M is estimated to collide with the pedestrian H. Furthermore, according to the above-described process, the notification device 1 can notify the pedestrian H of an alarm at an appropriate timing by excluding a possibility of alarm sounding at an early timing or a late timing without meaning because it is possible to provide the notification of the alarm by setting a collision margin time corresponding to the age range to which the age of the pedestrian H belongs or the location based on the traveling direction of the vehicle M. Furthermore, according to the above-described process, it is possible to notify only a pedestrian H (a child, a disabled person, or the like) having a terminal on which a dedicated application has been installed of an alarm without having to transmit an alarm signal to all pedestrians H because the alarm signal is transmitted to only the terminal 2 having a dedicated application program.

First Modified Example

In the above-described process, the terminal 2 may be configured to perform a process such as operating a vibrator or outputting alarm display to a display instead of or in combination with making an alarm sound. The above-described terminal 2 may be a dedicated terminal 2 that can be used for the notification system 100 other than a smartphone, or may be, for example, a small wireless earphone or a smart glass.

Second Modified Example

In the above-described process, the adjustment part 16 identifies the collision margin time from the data table based on the current location of the vehicle M, the traveling speed of the vehicle M, the traveling vector of the vehicle M, the current location of the pedestrian H, and the moving speed and the moving vector of the pedestrian H. However, the adjustment part 16 may be configured to calculate the collision margin time based on the current location of the vehicle M, the traveling speed of the vehicle M, the traveling vector of the vehicle M, the current location of the pedestrian H, and the moving speed and the moving vector of the pedestrian H. The collision margin time varies with the location of the pedestrian. Therefore, a collision margin time corresponding to the location of the pedestrian can be set and a notification of an alarm can be provided.

Third Modified Example

Figure 7:
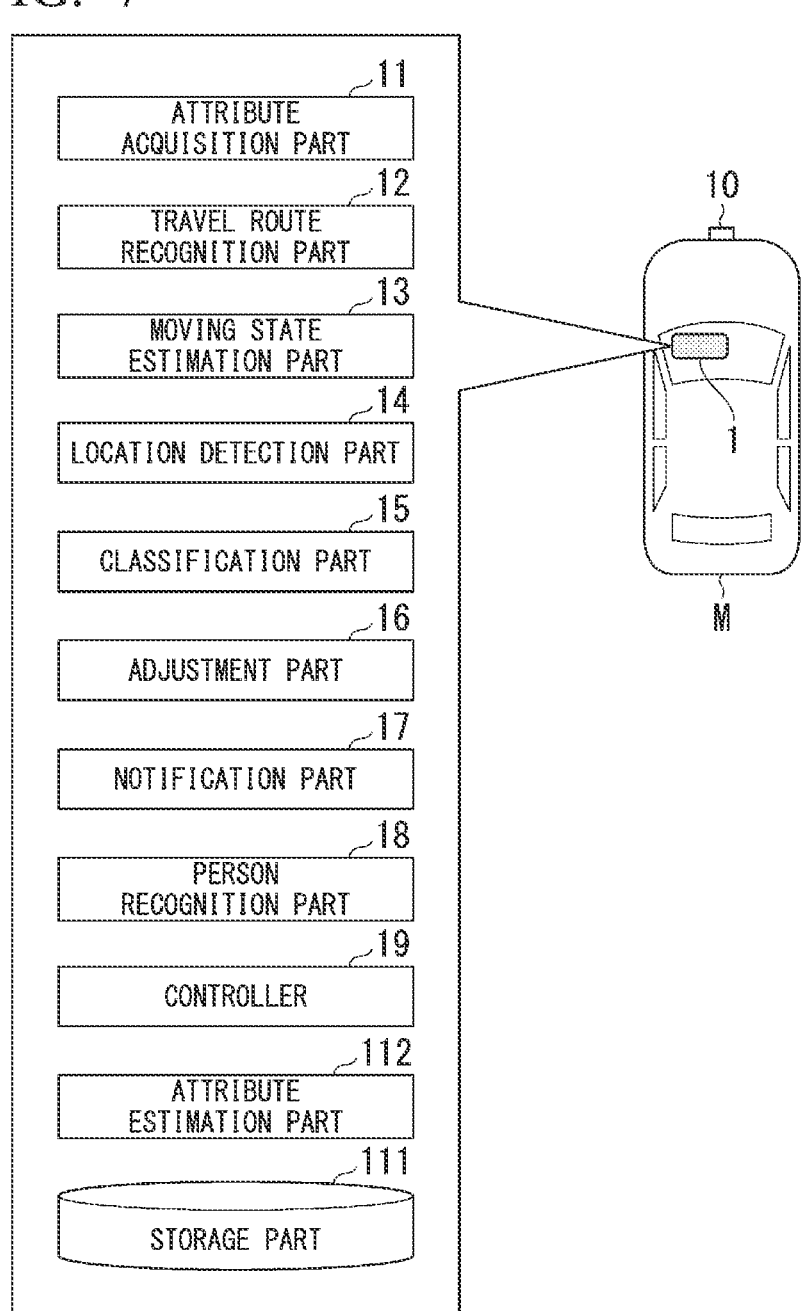
FIG. 7 is a second diagram showing functional blocks of the notification device according to the embodiment of the present invention.

FIG. 7 is a second diagram showing a functional block of the notification device.

An example in which age, which is the attribute information of a person, is included in the personal attribute information has been described in the above-described process. However, the notification device 1 includes an attribute estimation part 112, and the attribute estimation part 112 may estimate which of the first to third age ranges the user belong to based on a recognition result (estimated age) of the person shown in the captured image.

Fourth Modified Example

In the above-described process, the adjustment part 16 identifies the notification timing without using the moving direction of the pedestrian H. However, the adjustment part 16 may further identify the notification timing using the moving direction. In this case, the adjustment part 16 determines whether the moving direction of the pedestrian H intersects the traveling direction of the vehicle traveling along the travel route. The adjustment part 16 acquires the collision margin time recorded on a timing list stored in the storage part 111 in association with information of the age range (any one of the first to third age ranges) of the pedestrian H, the intersection status (the crossroads or the straight road) of the travel route along which the vehicle M travels associated with another travel route, the location information (the left side or the right side) of the pedestrian H in the traveling direction of the vehicle M, and the moving state (the walking or the running) of the pedestrian H only when the moving direction of the pedestrian H intersects the traveling direction of the vehicle traveling along the travel route. When the moving direction of the pedestrian H does not intersect the traveling direction of the vehicle traveling along the travel route, the adjustment part 16 may determine that the notification is not provided and stop the transmission of the alarm signal. The adjustment part 16 may calculate the collision margin time according to a predetermined calculation equation based on the age range (any one of the first to third age ranges) of the pedestrian H, the intersection status (the crossroads or the straight road) of the travel route along which the vehicle M travels associated with another travel route, the location information (the left side or the right side) of the pedestrian H in the traveling direction of the vehicle M, the moving state (the walking or the running) of the pedestrian H, and the moving direction of the pedestrian H.

Fifth Modified Example

In the above-described process, the adjustment part 16 identifies the notification timing based on the intersection status of the travel route along which the vehicle M travels and another travel route and the location of the pedestrian H. However, the adjustment part 16 may identify the notification timing without using the location of the pedestrian H. In this case, the adjustment part 16 may acquire the collision margin time recorded on the timing list stored in the storage part 111 in association with information of the age range (any one of the first to third age ranges) of the pedestrian H, the intersection status (the crossroads or the straight road) of the travel route along which the vehicle M travels associated with another travel route, and the moving state of the pedestrian H (the walking or the running).

Sixth Modified Example

In the above-described process, the notification device 1 identifies the location information of the terminal 2 from the personal attribute information received from the terminal 2. However, the location information of the terminal 2 may be detected by the notification device 1. For example, the communication module 105 of the notification device 1 may detect an arrival direction of a radio signal transmitted from the terminal 2 and its signal strength and detect the location information of the terminal 2 based on the information. The communication module 105 of the notification device 1 may detect the location information of the terminal 2 using another known method based on a radio signal transmitted from the terminal 2. The person recognition part 18 of the notification device 1 may recognize a face of the pedestrian H at a location within an image corresponding to the detected location information of the terminal 2. The moving state estimation part 13 may estimate the moving state (the traveling direction or the traveling speed) of the pedestrian H based on moving information of the face shown in a plurality of captured images. The attribute estimation part 112 may estimate the age of the person based on information of the face of the captured image.

Seventh Modified Example

In the above-described process, the notification device 1 transmits an alarm signal to the terminal 2 carried by the pedestrian. However, the notification device 1 may transmit the alarm signal to a notification destination device 2 in the vicinity of the pedestrian. The notification destination device 2 may be, for example, a display for an advertisement medium set near a pedestrian. In this case, the controller 19 of the notification device 1 transmits a transmission destination information request including the location information of its own device to the server device 3 at predetermined intervals. The server device 3 acquires the location information of the notification destination device and acquires network address information of the notification destination device 2 located at a predetermined distance such as 100 m from the location information. The network address information is, for example, address information of a communication network for transmitting information to the notification destination device. The server device 3 transmits network address information of the communication destination device to the notification device 1. The notification device 1 acquires the network address information of the notification destination device 2. The notification device 1 may acquire network addresses of notification destination devices located within a predetermined distance range based on the location information of the terminal 2 or a notification destination device nearest to the location information of the vehicle M among the notification destination devices from a data table in which location information of notification destination devices and network addresses stored in the storage part 111 of its own device in advance. When an alarm signal is transmitted in the above-described process, the notification device 1 transmits the alarm signal to the notification destination device using the acquired network address information of the notification destination device. The notification destination device that receives the alarm signal may be configured to display alarm information or output an alarm sound or the like. Thereby, the alarm information can be displayed to a notification destination device such as a display for the advertisement media in the vicinity of the pedestrian H or the alarm sound can be output. Also, the notification device 1 may simultaneously transmit the alarm signal to the terminal 2 and another notification destination device. Thereby, it is possible to obtain the effect of making it easier to convey an alarm to the pedestrian H.

The embodiment described above can be represented as follows.

A notification device including:

a storage device storing a program; and a hardware processor, wherein the hardware processor reads and executes the program stored in the storage device to:

acquire attribute information about a person located within a range of a predetermined distance from a moving object;

classify the person based on the attribute information; and adjust a timing of a notification for the person based on a classification result.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Notification device
2 Terminal
3 Server device
10 Camera
11 Attribute acquisition part
12 Travel route recognition part
13 Moving state estimation part
14 Location detection part
15 Classification part
16 Adjustment part
17 Notification part
18 Person recognition part
19 Controller
111 Storage part
112 Attribute estimation part
H Pedestrian
M Vehicle

What is claimed is:

1. A notification device comprising:

a memory that stores a program; and a processor that, upon execution of the program, is configured to operate as:

an attribute acquisition part configured to acquire attribute information about a person located within a range of a predetermined distance from a moving object;

a classification part configured to classify the person based on the attribute information;

an adjustment part configured to adjust a timing of a notification for the person based on a classification result;

a notification part configured to facilitate an output, at a user device, of the notification in the form of an alarm, a moving state estimation part configured to estimate a moving direction and a moving speed of the person; and a travel route recognition part configured to recognize an intersection status of a travel route along which the moving object travels associated with another travel route, wherein the adjustment part further adjusts the timing of the notification for the person based on the moving direction and the moving speed of the person, wherein the adjustment part adjusts the timing of the notification for the person based on the intersection status, wherein the adjustment part adjusts the timing of the notification based on a combination of an age range of the person, the moving direction of the person relative to the intersection status, and the moving speed of the person, wherein the adjustment part adjusts the timing so that an earliest notification is provided when it is difficult to acquire the attribute information within a predetermined period of time from a timing when the person has been recognized, and wherein the adjustment part identifies a collision margin time indicating a period of time from a time when the person moves to the travel route along which the moving object travels to the time when the person collides with the moving object according to a plurality of ages indicated in the classification result for the person and adjusts the timing of the notification to a timing when the collision margin time can be ensured, wherein the attribute information includes information about at least an age of the person, wherein the classification part outputs the classification result related to the age of the person based on the age, the classification part classifies the person into one of at least three age ranges based on the age of the person, and the adjustment part provides the notification at an earlier time when the person is in a youngest age range, compared to the other age ranges.

2. A notification method comprising:

acquiring, by a computer comprising a memory and a processor, attribute information about a person located within a range of a predetermined distance from a moving object;

classifying, by the computer, the person based on the attribute information which includes information about at least an age of the person;

adjusting, by the computer, a timing of a notification for the person based on a classification result;

outputting the classification result related to the age of the person based on the age;

classifying the person into one of at least three age ranges based on the age of the person;

providing the notification at an earlier time when the person is in a youngest age range, compared to the other age ranges;

facilitating, by the computer, an output, at a user device, of the notification in the form of an alarm;

estimating, by the computer, a moving direction and a moving speed of the person; and recognizing, by the computer, an intersection status of a travel route along which the moving object travels associated with another travel route, wherein the computer further adjusts the timing of the notification for the person based on the moving direction and the moving speed of the person, the computer adjusts the timing of the notification for the person based on the intersection status, the computer adjusts the timing of the notification based on a combination of an age range of the person, the moving direction of the person relative to the intersection status, and the moving speed of the person, the computer adjusts the timing so that an earliest notification is provided when it is difficult to acquire the attribute information within a predetermined period of time from a timing when the person has been recognized, and the computer identifies a collision margin time indicating a period of time from a time when the person moves to the travel route along which the moving object travels to the time when the person collides with the moving object according to a plurality of ages indicated in the classification result for the person and adjusts the timing of the notification to a timing when the collision margin time can be ensured.

3. The notification device according to claim 1, wherein the processor is further configured to operate as:

a person recognition part configured to recognize the person; and an attribute estimation part configured to estimate the attribute information of the person based on a result of recognizing the person.

4. A non-transitory machine-readable storage medium comprising a program for causing a computer to execute processes of:

acquiring attribute information about a person located within a range of a predetermined distance from a moving object;

classifying the person based on the attribute information which includes information about at least an age of the person;

adjusting a timing of a notification for the person based on a classification result;

outputting the classification result related to the age of the person based on the age;

classifying the person into one of at least three age ranges based on the age of the person;

providing the notification at an earlier time when the person is in a youngest age range, compared to the other age ranges;

facilitating an output, at a user device, of the notification in the form of an alarm;

estimating a moving direction and a moving speed of the person; and recognizing an intersection status of a travel route along which the moving object travels associated with another travel route, wherein the computer further adjusts the timing of the notification for the person based on the moving direction and the moving speed of the person, the computer adjusts the timing of the notification for the person based on the intersection status, the computer adjusts the timing of the notification based on a combination of an age range of the person, the moving direction of the person relative to the intersection status, and the moving speed of the person, the computer adjusts the timing so that an earliest notification is provided when it is difficult to acquire the attribute information within a predetermined period of time from a timing when the person has been recognized, and the computer identifies a collision margin time indicating a period of time from a time when the person moves to the travel route along which the moving object travels to the time when the person collides with the moving object according to a plurality of ages indicated in the classification result for the person and adjusts the timing of the notification to a timing when the collision margin time can be ensured.

5. The notification device according to claim 1, wherein the processor is further configured to operate as the moving state estimation part configured to detect the moving speed of the person, wherein the adjustment part further adjusts the timing of the notification for the person based on the moving speed of the person.

6. The notification device according to claim 1, wherein the adjustment part identifies a collision margin time indicating a period of time from the time when the person moves to the travel route along which the moving object travels to the time when the person collides with the moving object based on an intersection status of the travel route associated with the other travel route and a location of the person and adjusts the timing of the notification to the timing when the collision margin time can be ensured.

7. The notification device according to claim 1, wherein the processor is further configured to operate as the travel route recognition part configured to recognize intersection status of the travel route along which the moving object travels associated with the another travel route, wherein the adjustment part adjusts the timing of the notification for the person based on the intersection status and a location of the person.

8. The notification device according to claim 7, wherein the adjustment part identifies a collision margin time indicating a period of time from the time when the person moves to the travel route along which the moving object travels to the time when the person collides with the moving object based on intersection status of the travel route associated with the other travel route and the location of the person and adjusts the timing of the notification to the timing when the collision margin time can be ensured.

9. The notification device according to claim 7, wherein the adjustment part adjusts the timing so that the earliest notification is provided when it is difficult to recognize the intersection status of the travel route associated with the other travel route.

10. The notification device according to claim 5, wherein the adjustment part adjusts the timing so that the earliest notification is provided when it is difficult to detect the moving speed of the person.

11. The notification device according to claim 9, wherein the adjustment part identifies a collision margin time indicating a period of time from the time when the person moves to the travel route along which the moving object travels to the time when the person collides with the moving object based on intersection status of the travel route associated with the other travel route and the location of the person and adjusts the timing of the notification to the timing when the collision margin time can be ensured.

12. The notification device according to claim 1, wherein the adjustment part identifies a collision margin time indicating a period of time from the time when the person moves to the travel route along which the moving object travels to the time when the person collides with the moving object based on a result of classifying the moving speed of the person and adjusts the timing of the notification to the timing when the collision margin time can be ensured.

* * * * *